Patented Nov. 3, 1936

2,059,778

UNITED STATES PATENT OFFICE 2,059,778

MORTARS OR BINDERS CONTAINING CAOUTCHOUC AND PROCESS OF PREPARING SAME

Karl Dietz, Frankfort-on-the-Main, and Karl Frank, Bad Soden-on-the-Taunus, Germany, assignors to I. G. Farbenindustrie Aktiengesellschaft, Frankfort-on-the-Main, Germany No Drawing. Application July 17, 1934, Serial No. 735,712. In Germany November 17, 1932

4 Claims. (Cl. 106—23)

The present invention relates to mortars or binders containing caoutchouc and to a process of preparing same.

We have found that with the aid of aqueous emulsions of vulcanized or non-vulcanized caoutchouc there may be prepared mortars or binders suitable for cement work, masonries, plasters, coatings and paint-work by treating the caoutchouc emulsions with a mortar powder or binder which contains certain heterogeneous components.

The mortar powder must contain on the one hand basic, water-soluble or emulsifiable substances, and on the other hand solid substances as slowly soluble as possible in water, capable of reacting with alkali and reducing in this manner the basic character of the mixture. It is advisable to select the cement powders so that the substances capable of reacting with alkali are present in excess and, moreover, so that the water introduced by the caoutchouc emulsion or the additional components is absorbed by products of the reaction of the substances contained in the mortar powder or by substances especially added to the cement powder.

The latter may, for instance, be a mixture of readily soluble alkali silicate powder and alkali silico fluoride and filling agents, such as finely pulverized quartz, silex white, kaolin or pulverized talc. When this mortar powder is mixed with the caoutchouc emulsion the readily soluble alkali silicate dissolves first; in the beginning, the mortar is of a basic reaction and can be applied. After about half an hour the sodium silico-fluoride which has been added in the suitable proportion has reduced the basicity of alkali silicate, and causes the silicic acid and the caoutchouc emulsion to coagulate. During this phase the water contained in the mortar is bound in the form of gel or absorbed by the silicic acid obtained from alkali silicate and silico-fluoride.

The reaction of the mass is still alkaline throughout. By selecting for instance a correct proportion between the content of silico-fluoride and alkali silicate (considering for this selection that the reaction between these bodies is in accord with the equation $Na_2SiF_6 + 2Na_2O = 6NaF + SiO_2$) and by partially substituting alkali borate for the alkali silicate, it may be ensured that the hydrogel of the silicic acid is first formed while the reaction is alkaline. It follows that the second reaction that is the coagulation of the caoutchouc emulsified in a colloidal manner takes place only when the formation of gel is already complete. In consequence thereof the caoutchouc surrounds the particles of silicic acid gel and there is obtained an elastic, coherent caoutchouc-like mass which cannot be compared, as to its appearance and properties, with ordinary mortar which becomes very hard.

In such a manner there may be prepared solid, elastic, resistant cement-work, plasterings, jointings or paint-work.

If there is used a non-vulcanized caoutchouc emulsion there may be added the suitable vulcanizing agents in the course of the process, and the caoutchouc mass obtained may be vulcanized by the usual methods.

The alkali silicate may be substituted by other basic substances having the same effect, such as sodium aluminate, sodium borate, alkali hydroxide or alkaline-earth hydroxide. Instead of alkali silico-fluoride there may be used other substances which react with the alkali, for instance sodium boro-fluoride, aromatic sulfo-chlorides, organic acid esters, particularly the esters of polybasic acids, and acid anhydrides. It is important that the two components are present in the mortar in the aforenamed proportion and that the reaction occurs according to the indicated course. Instead of allowing the water contained in the mortar to set in the state of gel, it is also possible to add systematically such substances as absorb the water for instance by hydration, such as strongly calcined calcium-sulfate, cement, kieselguhr or the like. If mortars are prepared it is also possible to add other aqueous emulsions, for instance asphalt emulsions or moderate proportions of organic solvents, such as benzene.

The mortars thus obtained may be used for various purposes. They are particularly suitable in all cases, where an elastic jointing or plastering is necessary, not only in the construction of buildings, masonries or coatings but also for instance in the construction of motor cars for lining the walls of a carriage body for preventing the vibrations and diminishing resonance; moreover, for the preparation of an elastic intermediate layer between the underframe and the carriage body.

The following examples serve to illustrate the invention, but they are not intended to limit it thereto, the parts being by weight, if not stated otherwise:

(1) The cement powder consists of:

| | Parts |
|---|---|
| Borax | 8 |
| $Na_2SiF_6$ | 12 |
| Pulverized quartz | 55 |

The mixing solution consists of 100 parts by volume of caoutchouc emulsion and 25 parts of pulverized sodium silicate.

The cement powder and the solution are mixed in the necessary proportion to obtain more or less liquid or solid mortars (as is usual in making any other mortar). On an average there are used 40–60 grams of pulverized cement and 100 cc. of the mixing solution. Sulfur and an accelerator of vulcanization may be added, if required, to the mortars, if non-vulcanized caoutchouc emulsions are used in which the vulcanization occurs later in the finished mastic or maconry. For instance to 100 parts of a caoutchouc emulsion there are added 3 parts of sulfur and 0.1 part of an accelerator of vulcanization.

(2) The cement powder consists of:

| | Parts |
|---|---|
| Borax | 4 |
| Paratoluene-sulfochloride | 12 |
| Pulverized quartz | 50 |

The mixing solution consists of 100 cc. of caoutchouc emulsion and 20 parts of alkali silicate powder. The process is carried out as described above.

Instead of alkali silicate powder there may be used also alkali aluminate or bariumhydroxide in a soluble powdered form. It is advisable to use one part of Al(ONa)$_3$ instead of 3½ parts of alkali silicate powder and one part of bariumhydroxide instead of one part of alkali silicate powder.

We claim:

1. As a new composition of matter an elastic and substantially liquid-impermeable mixture for mortars comprising an aqueous caoutchouc emulsion containing alkali silicate, approximately 50% by weight of a cement powder containing alkali silicate, the weight being calculated on the weight of the caoutchouc emulsion, and a substance capable of reacting with the alkali of the alkali silicate whereby to reduce the basicity of the mixture, the amount of the alkali silicate being less than the amount of the caoutchouc emulsion and the amount of the substance reactive with alkali being at least equal to the theoretical combining amount.

2. As a new composition of matter, an elastic and substantially liquid-impermeable mixture for mortars comprising about 100 cc. of an aqueous caoutchouc emulsion containing alkali silicate, 40–60% by weight, calculated on the weight of the caoutchouc emulsion, of a cement powder containing alkali silicate, and a substance capable of reacting with the alkali of the alkali silicate whereby to reduce the basicity of the mixture, the amount of the alkali silicate being less than the amount of the caoutchouc emulsion and the amount of the substance reactive with alkali being at least equal to the theoretical combining amount.

3. As a new composition of matter a mixture for mortars which comprises about 100 cc. of an aqueous caoutchouc emulsion containing sodium silicate with 40 to 60 parts of a cement powder which contains 8 parts of borax, 12 parts of Na$_2$SiF$_6$ and 55 parts of pulverized quartz.

4. As a new composition of matter a mixture for mortars which comprises about 100 cc. of an aqueous caoutchouc emulsion containing sodium silicate with 40 to 60 parts of a cement powder which contains 4 parts of borax, 12 parts of paratoluene-sulfochloride and 50 parts of pulverized quartz.

KARL DIETZ.
KARL FRANK.